United States Patent
Kuwagaki

(10) Patent No.: US 11,892,111 B2
(45) Date of Patent: Feb. 6, 2024

(54) HOUSING DEVICE AND METHOD FOR MOUNTING HOUSING DEVICE

(71) Applicant: Waterworks Technology Development Organization Co., Ltd., Osaka (JP)

(72) Inventor: Daisuke Kuwagaki, Osaka (JP)

(73) Assignee: Waterworks Technology Development Organization Co., Ltd., Osaka (JP)

( * ) Notice: Subject to any disclaimer, the term of this patent is extended or adjusted under 35 U.S.C. 154(b) by 301 days.

(21) Appl. No.: 17/143,052

(22) Filed: Jan. 6, 2021

(65) Prior Publication Data
US 2021/0123553 A1  Apr. 29, 2021

Related U.S. Application Data

(63) Continuation-in-part of application No. PCT/JP2019/021719, filed on May 31, 2019.

(30) Foreign Application Priority Data

Jul. 10, 2018 (JP) .................................. 2018-130431

(51) Int. Cl.
*F16L 41/06* (2006.01)
*F16L 55/172* (2006.01)

(52) U.S. Cl.
CPC ............. *F16L 41/06* (2013.01); *F16L 55/172* (2013.01)

(58) Field of Classification Search
CPC ........ F16L 41/06; F16L 55/172; F16L 21/007
See application file for complete search history.

(56) References Cited

U.S. PATENT DOCUMENTS 4,015,634 A * 4/1977 Christie ................ F16L 58/188
285/373
4,652,023 A  3/1987 Timmons
(Continued)

FOREIGN PATENT DOCUMENTS

| FR | 2881203 A1 | 7/2006 |
| JP | 2000-227186 A | 8/2000 |
| JP | 2005-180523 A | 7/2005 |

(Continued)

OTHER PUBLICATIONS

Extended European Search Report issued for European Patent Application No. 19834254.5, dated Jul. 28, 2021 in 7 pages.
(Continued)

*Primary Examiner* — Matthew Troutman
*Assistant Examiner* — James A Linford
(74) *Attorney, Agent, or Firm* — Knobbe, Martens, Olson & Bear, LLP

(57) ABSTRACT

A split T-shaped pipe serving as a housing device and comprising: an annular case body that has a split part in at least one location in the circumferential direction, and that surrounds the outer circumferential surface of a water pipe in a sealed state with a seal material therebetween; and fasteners for tightening the split part, thereby joining a plurality of split pieces constituting the case body. Joining surfaces are provided at the circumferential end portions of the split pieces, and protrusions protruding along the circumferential direction are formed on the joining surfaces but only at both end portions of the case body in the pipe axis direction of the water pipe.

10 Claims, 10 Drawing Sheets

(56) References Cited

U.S. PATENT DOCUMENTS

2004/0222399 A1* 11/2004 Maichel .................. F16L 41/06
                                                            251/326
2019/0257433 A1*  8/2019 Nagamori ............. F16K 5/0407

FOREIGN PATENT DOCUMENTS

| | | |
|---|---|---|
| JP | 2006-214451 A | 8/2006 |
| JP | 2006-300203 A | 11/2006 |
| JP | 2007-170681 A | 7/2007 |
| JP | 2008-082418 A | 4/2008 |
| JP | 2009115206 A * | 5/2009 |
| JP | 2016-044793 A | 4/2016 |
| JP | 2016-070464 A | 5/2016 |
| JP | 2016173133 A * | 9/2016 |
| WO | 96/19694 A1 | 6/1996 |
| WO | 2006/079714 A1 | 8/2006 |

OTHER PUBLICATIONS

International Preliminary Report on Patentability for International Patent No. PCT/JP2019/021719, dated Jan. 12, 2021 in 11 pages.
Chinese Office Action issued for Chinese Patent Application No. 201980044227.7, dated Dec. 27, 2021 in 18 pages including English translation.
Chinese Office Action issued for Chinese Patent Application No. 201980044227.7, dated May 7, 2022 in 14 pages including English translation.
Japanese Office Action issued for Japanese Patent Application No. 2020-530030, dated Aug. 30, 2021 in 10 pages including English translation.
International Search Report for International Application No. PCT/JP2019/021719, dated Jul. 30, 2019 in 2 pages.

* cited by examiner

Prior Art

HOUSING DEVICE AND METHOD FOR MOUNTING HOUSING DEVICE

BACKGROUND

The present disclosure relates to a housing device capable of being mounted on a fluid pipe and to a method for mounting such housing device.

Housing devices for enclosing the outer circumferential surface of a water pipe or other such fluid pipe in a sealed state have been employed conventionally. Such housing devices have been equipped with an annular case having a split structure, and a clamp that clamps the split portions of that case. Japanese Patent Application Publication Kokai No. 2016-70464 describes a housing (split T-shaped pipe) employed when carrying out plumbing operations on a live pipe through which water flows without interruption as an example of a housing device. Furthermore, Japanese Patent Application Publication Kokai No. 2008-82418 describes a water leak repair fixture employed during repair of leaks at couplings in fluid pipes as another example of a housing device.

It is ordinarily the case that control of clamping by the clamp is carried out based on clamping torque and the size of the gap at the split portion, and that the gap at the split portion of the case is provided in consistent fashion. However, where as at FIG. 10 a restraint fixture 92 is installed at the housing device 91, there is a possibility that the restraint fixture 92 will become separated from the housing device 91 due to the gap at the split portion. This is because action of a separating force F which tends to cause fluid pipe 93 to separate from housing device 91 causes a force in the diagonal X direction to act on the end of case 95 by way of engagement portion 94 of restraint fixture 92, causing compression of sealing material 96 and reduction in the size of the gap at the split portion, as a result of which diameter of the end of case 95 is reduced, allowing it to come free from the engagement portion 94.

One stratagem to address this is to regulate the gap by means of a protrusion (spacer) formed on the joint surface at the split portion as at Japanese Patent Application Publication Kokai No. 2006-214451 and No. 2000-227186. However, while such constitution may make it possible to suppress the reduction in diameter that would otherwise occur due to action of a separating force, because there is no leeway to adjust the gap through actuation of the clamp, its use is limited to fluid pipes of a particular outside diameter. It is therefore not economical, as it cannot be made to accommodate situations in which the outside diameter varies depending on the type of pipe and so forth; for example, one might be able to mount it on a cast iron pipe of nominal diameter $\phi$150 (169.0 mm outside diameter) but be unable to mount it on a steel pipe of the same $\phi$150 nominal diameter (165.2 mm outside diameter).

SUMMARY

The present disclosure was conceived in light of such situation, it being an object thereof to provide a housing device capable of suppressing reduction in diameter despite action of a separating force while also being capable of accommodating situations in which outside diameter varies depending on the type of pipe and so forth, and a method for mounting such a housing device.

According to the present disclosure, there is provided a housing device having an annular case having a split portion at at least one location in a circumferential direction, and enclosing an outer circumferential surface of a fluid pipe in a sealed state by way of sealing material; and a clamp that causes a plurality of split segments that make up the case to be joined when the split portion is clamped; and protrusions are formed in such fashion as to protrude in the circumferential direction only at locations on joint surfaces provided at ends in the circumferential direction of the split segments that are at either end, in a pipe axial direction of the fluid pipe, of the case.

In accordance with such constitution, when the clamp is actuated to clamp the split portion, because protrusions cause a gap to be formed at the split portion that is relatively small at either end of the case, it is possible to suppress reduction in diameter when a separating force acts thereon. And because protrusions are not formed at the central region of the case but are formed only at either end of the case, this produces leeway to adjust the gap through actuation of the clamp, and makes it possible to accommodate situations in which outside diameter varies depending on the type of pipe and so forth.

This makes it possible to cause sealing material present within gap(s) at split portion(s) to be compressed uniformly. Furthermore, protrusion segments are formed at joint surfaces of respective split segments, as a result of which design of joint surfaces is made consistent, and there is the advantage that this can be achieved in a manner that is not dependent on the particular combination of split segments employed.

Such constitution makes it possible for the effect whereby reduction in diameter is suppressed when a separating force acts thereon to be suitably provided.

According to the present disclosure, there is provided a method for mounting a housing device comprising an annular case having a split portion at at least one location in a circumferential direction, and a clamp for clamping the split portion, the method for mounting the housing device being characterized in that protrusions are formed in such fashion as to protrude in the circumferential direction only at locations on joint surfaces provided at ends in the circumferential direction of a plurality of split segments that make up the case that are at either end, in a pipe axial direction of a fluid pipe, of the case; and when the case is made to enclose an outer circumferential surface of the fluid pipe in a sealed state, and the split portion is clamped to cause the plurality of split segments to be joined, the protrusions cause a gap to be formed at the split portion that is smaller at either end of the case than at another location.

In accordance with such method, when the clamp is actuated to clamp the split portion, because protrusions cause a gap to be formed at the split portion that is relatively small at either end of the case, it is possible to suppress reduction in diameter when a separating force acts thereon. And because protrusions are not formed at the central region of the case but are formed only at either end of the case, this produces leeway to adjust the gap through actuation of the clamp, and makes it possible to accommodate situations in which outside diameter varies depending on the type of pipe and so forth.

This makes it possible to uniformly compress sealing material present within gap(s) at split portion(s). Furthermore, protrusion segments are formed at joint surfaces of respective split segments, as a result of which design of joint surfaces is made consistent, and there is the advantage that this can be achieved in a manner that is not dependent on the particular combination of split segments employed.

Such method makes it possible for the effect whereby reduction in diameter is suppressed when a separating force acts thereon to be suitably provided.

A restraint fixture that has a two-part split structure in which a pair of split portions may be present is made to engage with and be mounted to an outside of an end of the case that has a two-part split structure in which a pair of split portions may be present, at which time the pair of split portions that may be present at the case are arranged in parallel fashion with respect to the horizontal direction, and the pair of split portions that may be present at the restraint fixture are arranged in parallel fashion with respect to the vertical direction.

By causing the pair of split portions that are present at the case to be arranged in parallel fashion with respect to the horizontal direction, this results in a situation in which the end of that case will primarily experience reduction in diameter in the vertical direction and will tend not to experience reduction in diameter in the horizontal direction. Furthermore, when the pair of split portions that are present at the restraint fixture are arranged in parallel fashion with respect to the vertical direction, this causes the engagement portion of the restraint fixture which engages with the end of the case to be arranged in the horizontal direction, which is the direction in which reduction in diameter at the end of the case tends not to occur. As a result, in conjunction with the aforementioned effect whereby reduction in diameter is suppressed, it is possible to more definitively prevent the restraint fixture from becoming separated from the housing device.

DETAILED DESCRIPTION OF THE PREFERRED EMBODIMENTS

Below, embodiments of the present disclosure are described with reference to the drawings.

Figure 1:
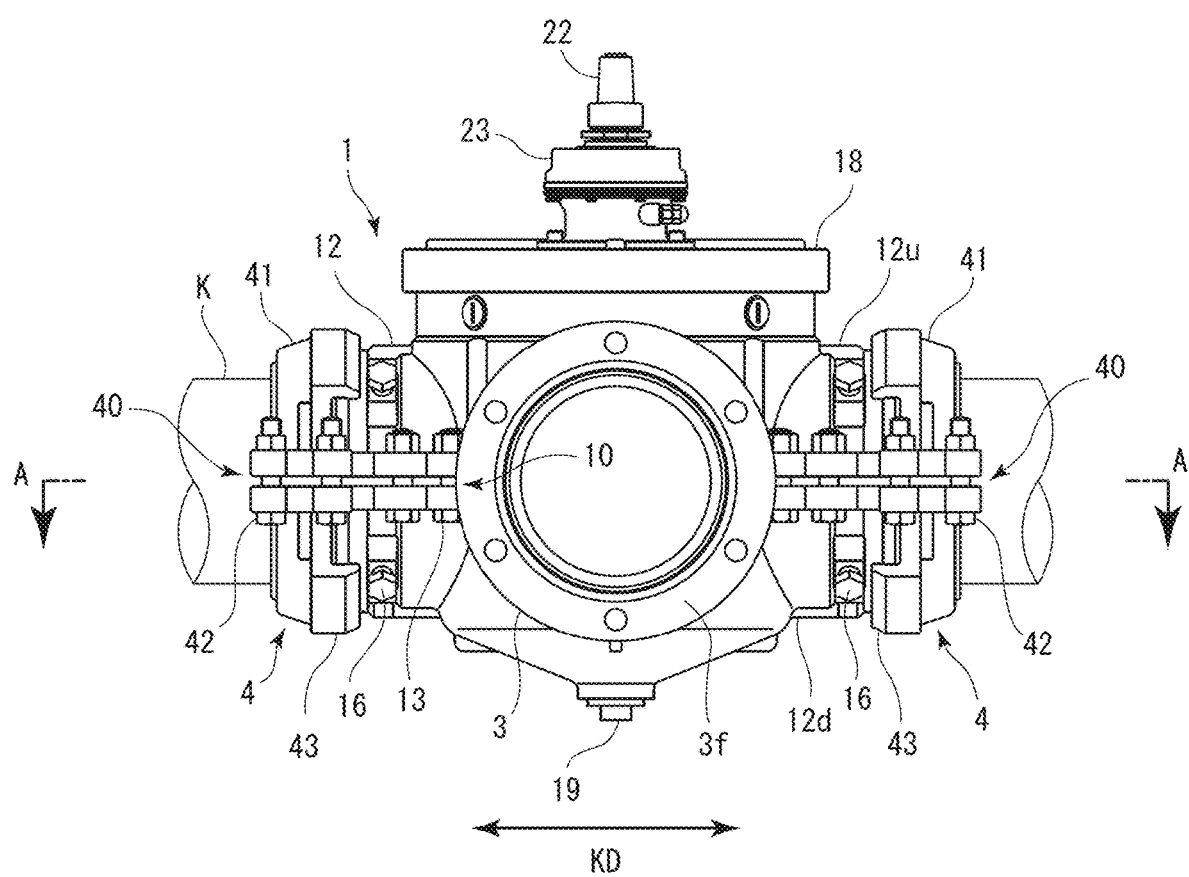
FIG. 1 Front view of split T-shaped pipe which is an example of a housing device associated with the present disclosure.
Figure 2:
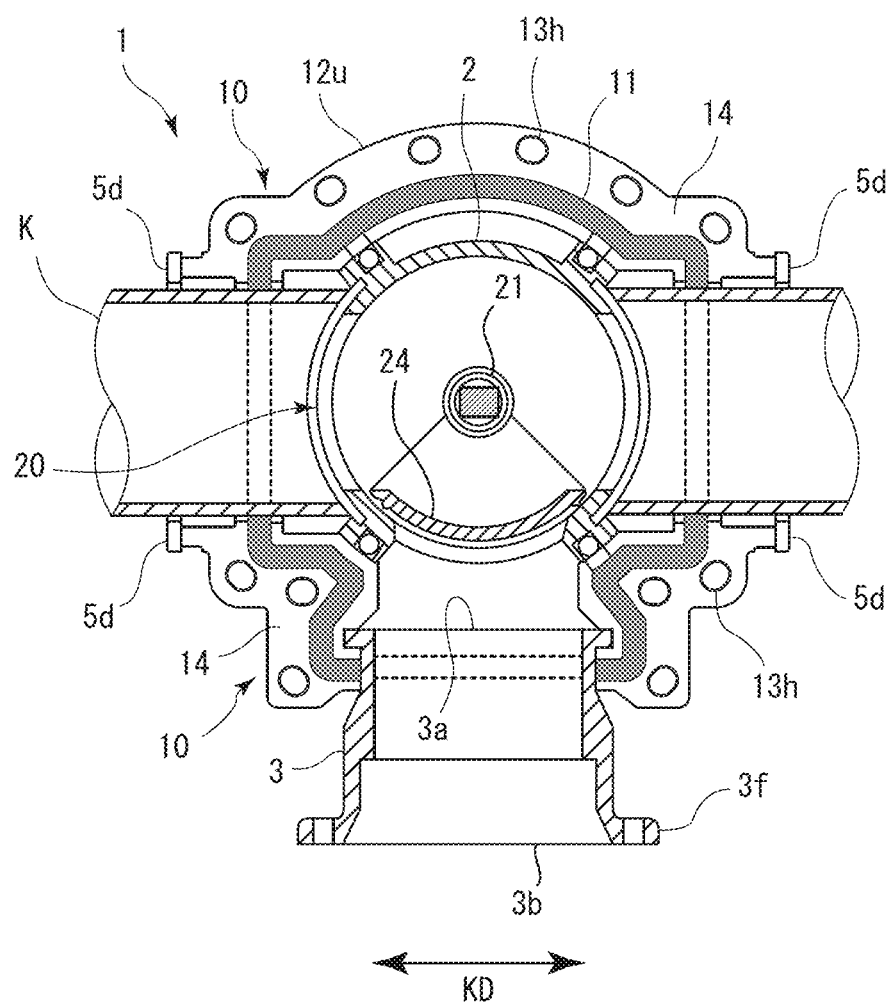
FIG. 2 Sectional view of section A-A in FIG. 1.
Figure 3A:
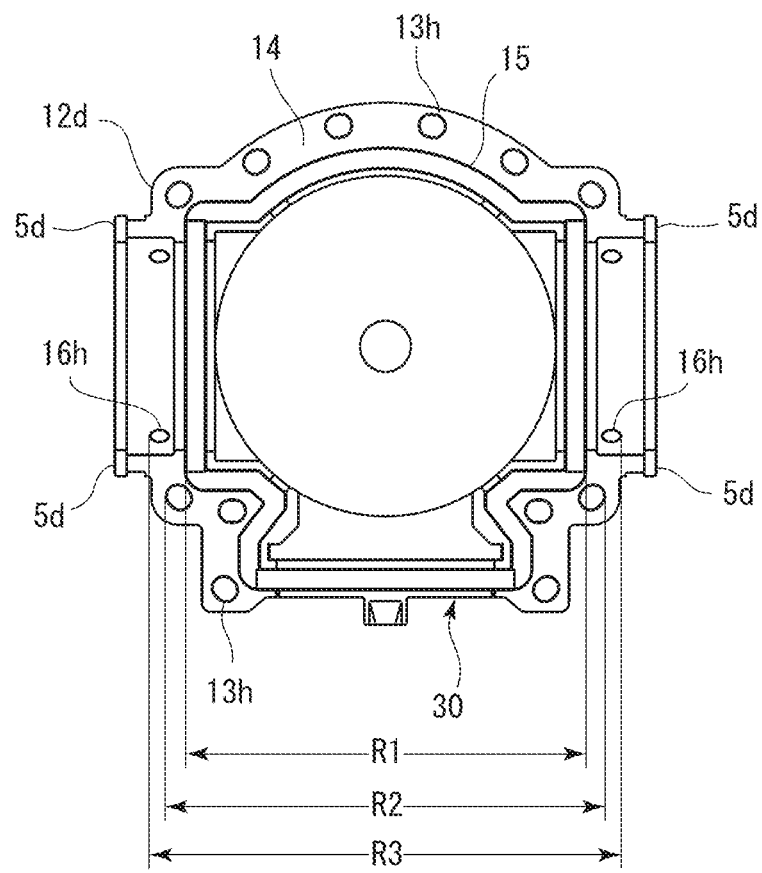
FIG. 3A Plan view showing lower split segment.
Figure 3B:
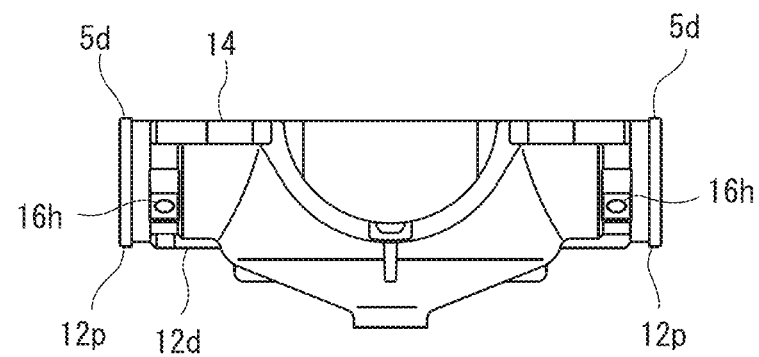
FIG. 3B Front view showing lower split segment.
Figure 4A:
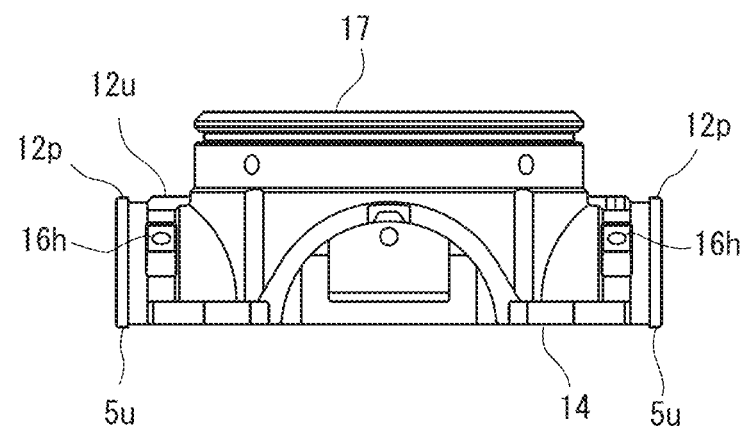
FIG. 4A Front view showing upper split segment.
Figure 4B:
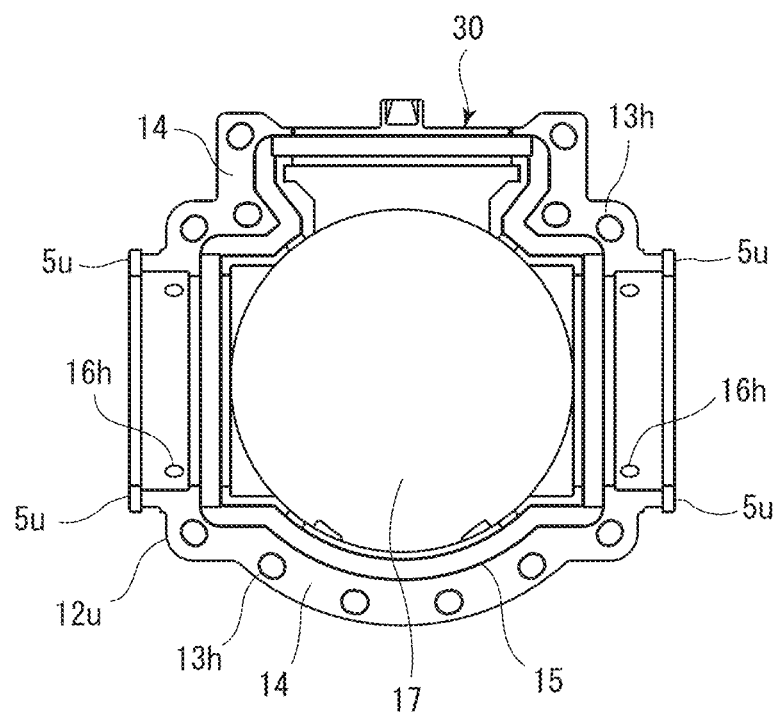
FIG. 4B Bottom view showing upper split segment.

The present embodiment takes the example of a housing device which is capable of being employed when carrying out plumbing operations on a previously installed live water pipe through which water flows without interruption while such plumbing operations are being carried out. FIG. 1 is a front view showing split T-shaped pipe 1 serving as housing device. At FIG. 1, the direction spanning top and bottom corresponds to the vertical direction, and the direction spanning left and right as well as the direction perpendicular to the plane of the paper respectively correspond to horizontal directions. FIG. 2 is a sectional view of section A-A in FIG. 1; note, however, that restraint fixtures 4, 4 are not shown. Split T-shaped pipe 1 comprises a plurality of (two in the present embodiment) split segments, the lower split segment 12$d$ thereamong being shown in FIG. 3, and the upper split segment 12$u$ thereamong being shown in FIGS. 4A and 4B.

Split T-shaped pipe 1 (an example of a housing device) is equipped with annular case 12 and clamp 13. Case 12 has a split portion 10 at at least one location (two locations in the present embodiment) in the circumferential direction, and encloses the outer circumferential surface of water pipe K (an example of a fluid pipe) in a sealed state by way of sealing material 11. Clamp 13 clamps split portions 10 to cause the plurality of split segments 12$d$. 12$u$ that make up case 12 to be joined. Split T-shaped pipe 1 comprises an upper/lower split structure in which there are a pair of split portions 10, 10. Case 12 might, for example, be formed from ductile cast iron. Clamp 13 comprises bolt(s) and nut(s).

Contained within the interior of split T-shaped pipe 1 is valve device 20 which is equipped with inner valve box 2. The overall shape of inner valve box 2 being cylindrical, it is arranged, in such fashion as to cause the axial direction thereof to be directed in the direction that spans top and bottom, at a cut location of water pipe K which is provided when carrying out plumbing operations on a live pipe through which water flows without interruption. At a location above inner valve box 2, reduction device 23 equipped with actuatable portion 22 coupled to valve shaft 21 is provided in cap-like fashion. Valve body 24 incorporated within inner valve box 2 is constituted so as to permit rotation in correspondence to actuation by actuatable portion 22. Stoppage and/or switching of path(s) through which water flows within water pipe K is accomplished in correspondence to rotation of valve body 24. Formed at upper split segment 12$u$ is opening 17 through which inner valve box 2 and a hole saw (not shown) are capable of being inserted and removed. Opening 17 is covered by lid 18 in such fashion as to allow communication to the exterior by actuatable portion 22 so as to permit actuation from the exterior.

The gaps at split portions 10 of case 12, and the gaps between water pipe K and either end, in the pipe axial direction KD of water pipe K, of case 12, are sealed by sealing material 11, 11. To better distinguish this in the drawing, sealing material 11 is shown in gray shading at FIG. 2. Sealing material 11 is respectively installed at split segments 12$d$, 12$u$. Flange-like joint surfaces 14 are respectively provided at the ends in the circumferential direction of split segments 12$d$. 12$u$. Sealing material 11 engages with groove 15 formed at the surface of joint surface 14. Sealing material 11 extends in the pipe axial direction KD along joint surface 14 in continuous fashion between the two ends of case 12.

At respective split portions 10, a pair of joint surfaces 14, 14 are mutually opposed, sealing material 11, 11 mutually adhering thereto causing the gaps at split portions 10 to be sealed in accompaniment to clamping by clamp 13. Provided at the pair of mutually opposed joint surfaces 14, 14 at split portions 10 are bolt holes 13$h$ for respectively permitting insertion therethrough of bolts of clamp 13. Furthermore, provided at either end of case 12 are bolt holes 16$h$ for respectively permitting insertion therethrough of adjustment bolts 16. By causing the tips of adjustment bolts 16 to press against the outer circumferential surface of water pipe K, it is possible to carry out adjustment in terms of centering of case 12 with respect to water pipe K.

Split T-shaped pipe 1 has branched pipe connector 30 for connection of branched pipe 3 at a central region in the pipe axial direction KD of case 12. The gap between branched pipe 3 and split T-shaped pipe 1 is sealed by sealing material 11, 11. Base 3a of branched pipe 3 is straddled from above and below by branched pipe connector 30, as a result of which branched pipe 3 is connected to split T-shaped pipe 1. Note, however, that the manner in which connection is made between split T-shaped pipe 1 and branched pipe 3 is not limited hereto. Furthermore, whereas tip 3b of branched pipe 3 is formed such that the socket thereof has a flange 3f, there is no limitation with respect thereto. Another branched pipe or a plug, not shown, may be connected to tip 3b.

Figure 5:
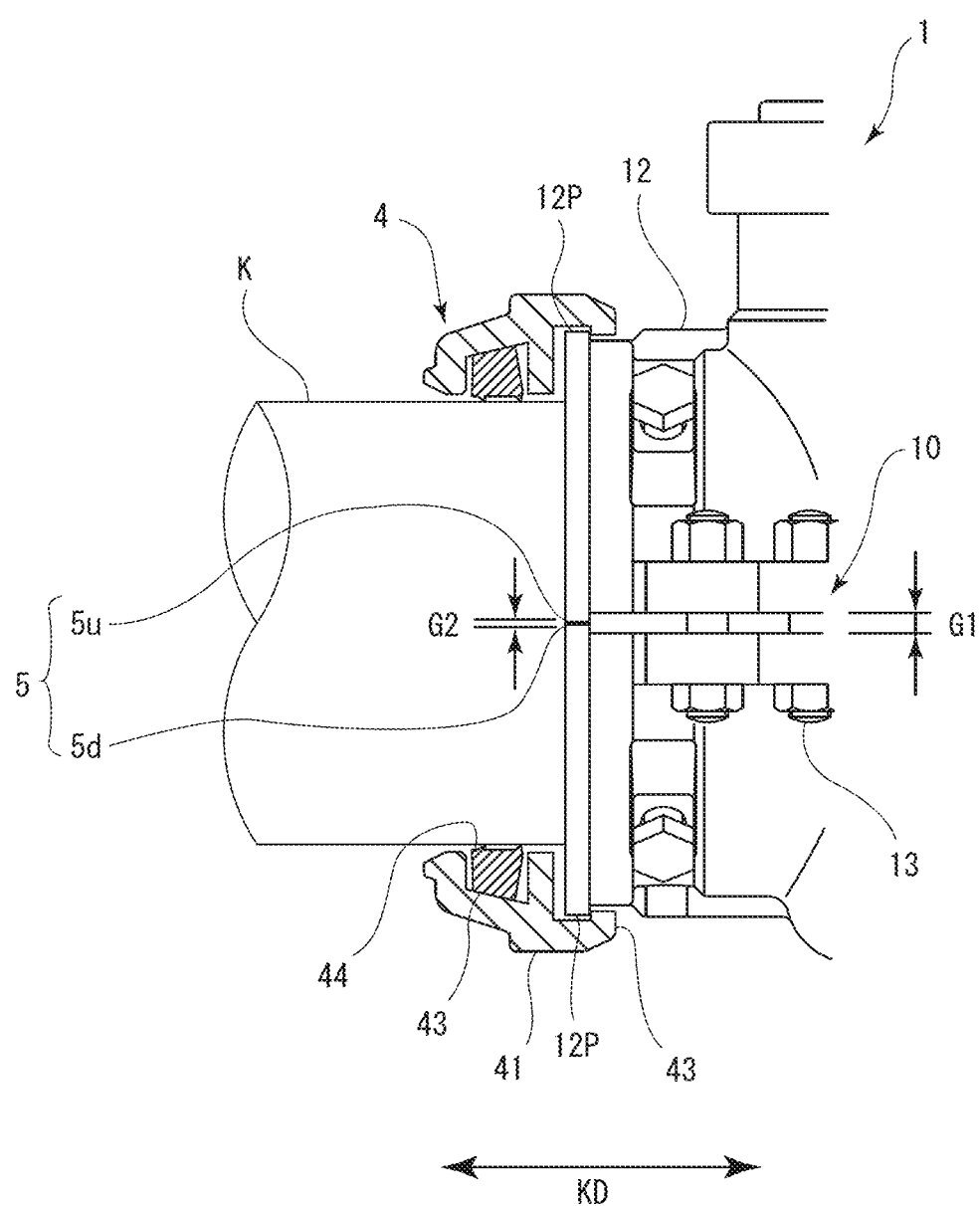
FIG. 5 Partial sectional view showing end of case.

Split T-shaped pipe 1 is equipped with restraint fixtures 4, 4 for preventing water pipe K from being separated from case 12. Restraint fixtures 4 respectively engage with and are mounted to the outside of either end in the pipe axial direction KD of case 12. FIG. 5 is a sectional view of restraint fixture 4 located at the left side in FIG. 1. Restraint fixture 4 has an annular housing 41 having a split portion 40 at at least one location (two locations in the present embodiment) in the circumferential direction, a clamp 42 that clamps split portion 40, a hook-like engagement portion 43 that engages with the end of case 12, and a detent member 44 that is capable of being trapped against the outer circumferential surface of water pipe K. In accordance with the present embodiment, restraint fixture 4 comprises a two-part split structure in which there are a pair of split portions 40, 40.

Clamp 42 comprises bolt(s) and nut(s). Formed at the end of case 12 is projection 12p which protrudes toward the exterior in the pipe radial direction. When a separating force acts, engagement portion 43 engages with projection 12p in the pipe axial direction KD, as a result of which water pipe K is prevented from coming free from split T-shaped pipe 1. Detent member 44 is contained within containing groove 43 formed at the inner circumferential surface of housing 41. Actuating clamp 42 to clamp split portions 40 causes these to be pressed on in such fashion as to cause the inner surface of containing groove 43 to be directed toward water pipe K. Note, however, that there is no limitation with respect thereto, it being possible to employ a structure in which a set screw installed at housing 41 is capable of pressing on detent member 44 (see FIGS. 7 through 9).

As shown in FIGS. 2 through 5, protrusion 5 which protrudes in the circumferential direction is formed at joint surface 14. Protrusion 5 is provided in integral fashion with respect to joint surface 14, being formed from the material (e.g., ductile cast iron or other such metal) of case 12. Protrusion(s) 5 are formed at locations on joint surface 14 which are not in the central region in the pipe axial direction KD of case 12 but only at locations thereon which are at either end in the pipe axial direction KD of case 12. In accordance with the present embodiment, a pair of protrusions 5 are provided at left and right on joint surface 14. Furthermore, in accordance with the present embodiment, protrusion segments 5d, 5u are respectively provided at the pair of mutually opposed joint surfaces 14, 14, such that protrusions 5 consist of pairs of protrusion segments 5d, 5u which are mutually opposed in the circumferential direction.

When split portions 10 are clamped in a state such as is shown at FIG. 5, gap G1 is provided between the pair of joint surfaces 14, 14. Furthermore, provided at locations where protrusions 5 are formed at either end of case 12 is gap G2 which is smaller than gap G1. For example, where water pipe K is ductile cast iron pipe of nominal diameter φ200 (220.0 mm outside diameter), 10.0 mm might be employed at gap G1, and 4.0 mm might be employed at gap G2. Accordingly, in such case, the amounts (heights) by which the pair of protrusion segments 5d, 5u would protrude relative to the surface of joint surface 14 would respectively be 3.0 mm. While gap G2 is greater than 0 mm in the present embodiment, there is no limitation with respect thereto, it being possible to cause the pair of protrusion segments 5d, 5u to mutually abut such that gap G2 is 0 mm.

Where no protrusions 5 are formed it will be possible for the diameter at the end of case 12 to be reduced by a magnitude which corresponds to gap G1 (e.g., 10 mm). To address this, in accordance with the present embodiment, formation of protrusions 5 makes it possible for reduction in the diameter at the end of case 12 to be no more than a magnitude which at a maximum corresponds to gap G2 (e.g., 4 mm). By thus using protrusions 5 to cause relatively small gaps at split portions 10 to be formed at either end of case 12, it is possible to suppress reduction in diameter at the end of case 12. For this reason, when a separating force acts on the end of case 12 by way of engagement portion 43, it is possible to prevent projection 12p from coming free from engagement portion 43, and to in turn prevent restraint fixture 4 from becoming separated from split T-shaped pipe 1. In addition, because it is possible to suppress compression of sealing material 11, 11 that would otherwise occur due to reduction in diameter at locations near the end of case 12, the balanced compression that was achieved due to the initial uniformly clamped state is not disturbed, which makes it possible to reduce the risk of water leakage.

Furthermore, because no protrusion 5 is formed at the central region of case 12, this makes it possible to accommodate situations in which outside diameter varies depending on the type of pipe and so forth. For example, where this is mounted on a water pipe K that is ductile cast iron pipe of nominal diameter φ200 and split portions 10 are clamped to achieve a gap G1 of 10 mm such that a suitable sealed state is obtained, for that split T-shaped pipe 1 to be able to accommodate steel pipe of nominal diameter φ200 (216.3 mm outside diameter) it will be necessary to further clamp split portions 10 to achieve a smaller gap G1. However, where protrusions 5 are formed at the central region of case 12, because there will be little leeway to adjust (decrease) gap G1 at split portion 10, it will be difficult to obtain a suitable sealed state. In accordance with the present embodiment, protrusion 5 are therefore not formed at the central region of case 12, producing leeway to adjust the gap at split portion 10, and making it possible to accommodate fluid pipes of differing outside diameters.

To appropriately achieve the effect whereby reduction in diameter at the end of case 12 is suppressed, it is preferred as in the present embodiment that protrusion(s) 5 be located at edge(s) of end(s) in the pipe axial direction KD of case 12. Furthermore, from the standpoint of ensuring that there will be leeway to adjust the gap at split portion 10, it is preferred that protrusions 5 not be formed in the region (i.e., region R1 at FIG. 3) within which groove 15 (or sealing material 11) is provided in the pipe axial direction KD, it is more preferred that these not be formed in the region (i.e., region R2 at FIG. 3) toward the interior in the pipe axial direction KD from bolt holes 13h (or clamp 13), and it is further preferred that these not be formed in the region (i.e., region R3 at FIG. 3) toward the interior in the pipe axial direction KD from bolt holes 16h (or adjustment bolts 16).

As has been described, in accordance with the present embodiment, protrusions 5 consist of pairs of protrusion segments 5d, 5u which are mutually opposed in the circumferential direction. When split portion 10 is clamped, the pairs of protrusion segments 5d, 5u making up these protrusions 5 are mutually opposed. Such constitution makes it possible for sealing material 11, 11 which is present within the gap at the split portion 10 to be compressed uniformly. Furthermore, because design of joint surfaces 14, 14 at respective split segments 12d, 12u is made consistent, there is the advantage that this can be achieved in a manner that is not dependent on the particular combination of split segments employed, such that, e.g., in the context of a leak repair fixture such as is described below, there is no longer a need to separately fabricate the die for molding the lower split segment and the die for molding the upper split segment. Note, however, that there is no limitation with respect thereto, there being no objection to employment of a structure in which a single protrusion that protrudes by an amount which corresponds to the total amount by which a pair of protrusion segments 5d, 5u protrude is formed on only one of the pair of joint surfaces 14, 14.

To carry out plumbing operations in which valve device 20 is installed on a live pipe through which water flows without interruption, split T-shaped pipe 1 is first mounted in the required zone of pipe conduit at the previously installed water pipe K. More specifically, the outer circumferential surface of water pipe K is enclosed in a sealed state by case 12, and split portions 10 are clamped, causing split segments 12d, 12u to be joined. At such time, protrusion 5 causes formation of gap G2 at split portion 10 at either end of case 12 that is smaller than that formed at another location (i.e., at the central region in the pipe axial direction KD of case 12). While control of clamping by clamp 13 is carried out based on clamping torque and the size of the gap(s) at split portion(s) 10, where pair(s) of protrusion segments 5d, 5u are made to mutually abut, because gap G1 will be defined by protrusion(s) 5, control of clamping by clamp 13 will be facilitated.

Next, so as to prevent water pipe K from becoming separated from case 12, restraint fixtures 4, 4 are made to respectively engage with and be mounted to the outside of either end in the pipe axial direction KD of case 12. A hole saw (not shown) is thereafter inserted within case 12 by way of opening 17, and water pipe K, which is a live pipe through which water flows without interruption, is cut. Where required, drain 19 may be opened and water discharged therefrom to permit shavings produced by cutting to be discharged therefrom. Upon completion of cutting of water pipe K, the hole saw is removed therefrom. Valve body 24 which has inner valve box 2 incorporated therewithin is then inserted into the interior of case 12, and opening 17 is covered by lid 18.

As shown in FIG. 1, in accordance with the present embodiment, restraint fixture 4 which has a two-part split structure is made to engage with and be mounted to the outside of the end of case 12 which similarly has a two-part split structure, at which time the pair of split portions 10, 10 that are present at case 12 are arranged in parallel fashion with respect to the horizontal direction, and the pair of split portions 40, 40 that are present at restraint fixture 4 are arranged in parallel fashion with respect to the horizontal direction. Note, however, that there is no limitation with respect thereto, it being possible as shown in FIG. 6 to cause the pair of split portions 10, 10 that are present at case 12 to be arranged in parallel fashion with respect to the horizontal direction, but to cause the pair of split portions 40, 40 that are present at restraint fixture 4 to be arranged in parallel fashion with respect to the vertical direction.

Because case 12 is such that decrease in the size of the gap at split portion 10 causes reduction in diameter, the end of case 12 at which the pair of split portions 10, 10 are arranged in parallel fashion with respect to the horizontal direction will primarily experience reduction in diameter in the vertical direction and will tend not to experience reduction in diameter in the horizontal direction. In addition, causing the pair of split portions 40, 40 to be arranged in parallel fashion with respect to the vertical direction as at FIG. 6 results in a situation in which engagement portion 43 of restraint fixture 4 which engages with the end of case 12 is arranged in the horizontal direction, which is the direction in which reduction in diameter at the end of case 12 tends not to occur. As a result, in conjunction with the aforementioned effect whereby reduction in diameter at the end of case 12 is suppressed, it is possible to more definitively prevent restraint fixture 4 from becoming separated from split T-shaped pipe 1.

Because when as described above the pair of split portions 10, 10 that are present at case 12 are arranged in parallel fashion with respect to the horizontal direction and the pair of split portions 40, 40 that are present at restraint fixture 4 are arranged in parallel fashion with respect to the vertical direction, action of a separating force will cause split segment 12d and split segment 12u to be pulled on uniformly, the effect whereby reduction in diameter at the end of case 12 is suppressed is provided, and there is great improvement in the action whereby separation is prevented. Because this effect is due to the manner of attachment of restraint fixture 4, although there will be increased effect in terms of improvement when this is carried out in combination with employment of protrusion(s) 5 as at FIG. 6, effect in terms of improvement may also be obtained even when this is not carried out in combination with employment of protrusion(s) 5.

Figure 6:
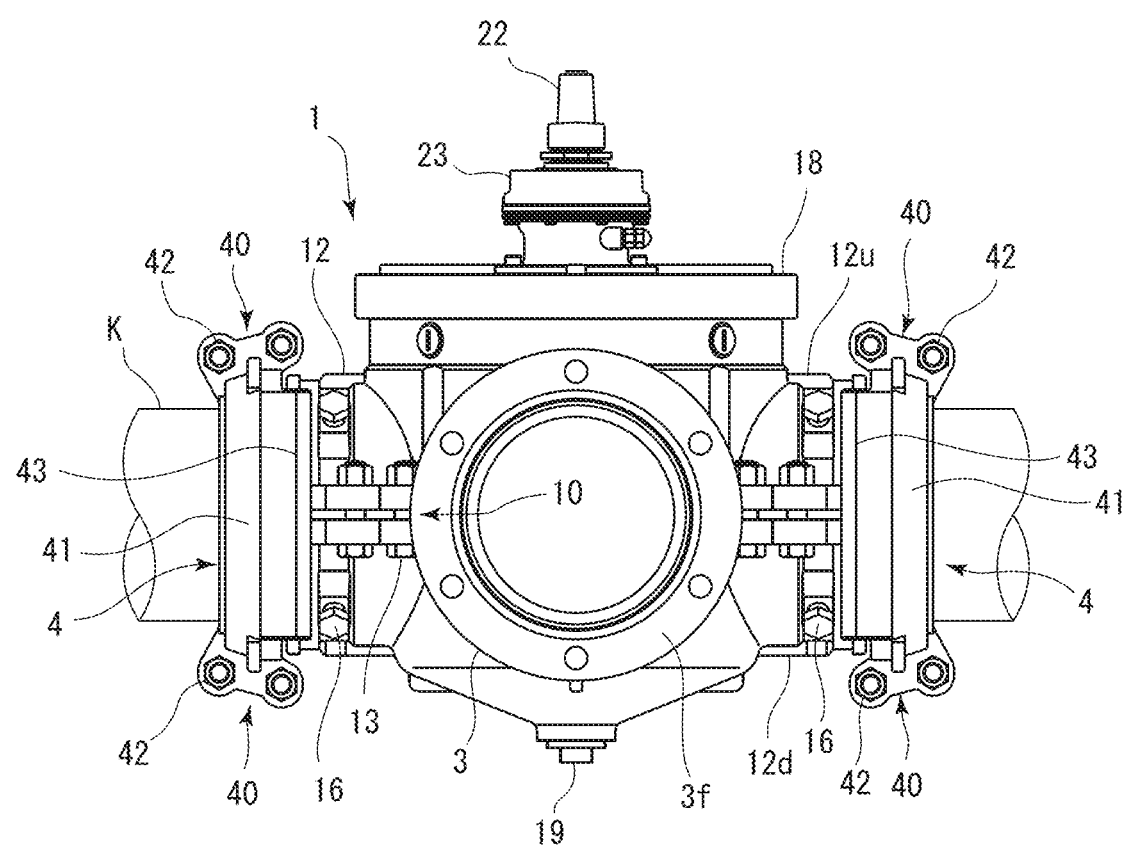
FIG. 6 Front view showing variation related to mounting of restraint fixture.

Although not included within the present disclosure, even where the characteristic constitution whereby protrusion(s) 5 are formed only at the two ends of the case is not provided, by causing restraint fixture(s) to be provided as at FIG. 6, it will therefore still be possible to suppress reduction in diameter when a separating force acts thereon. In such case, the housing device may comprise an annular case having a pair of split portions and enclosing an outer circumferential surface of a fluid pipe in a sealed state by way of sealing material; a clamp that causes a plurality of split segments that make up the case to be joined when those split portions are clamped; and a restraint fixture that has a two-part split structure and that is made to engage with and be mounted to the outside of the end of the case; wherein the pair of split portions that are present at the case are arranged in parallel fashion with respect to the horizontal direction, and the pair of split portions that are present at the restraint fixture are arranged in parallel fashion with respect to the vertical direction. Furthermore, the method for mounting the housing device may be such that an annular case in which a pair of split portions are present, a clamp for clamping the split portions, and a restraint fixture that has a two-part split structure is made to engage with and be mounted to the outside of the end of the case that has a two-part split structure in which the pair of split portions are present are provided; and when the restraint fixture is made to engage with and be mounted to the outside of the end of the case, the pair of split portions that are present at the case are arranged in parallel fashion with respect to the horizontal direction, and the pair of split portions that are present at the restraint fixture are arranged in parallel fashion with respect to the vertical direction.

Figure 7:
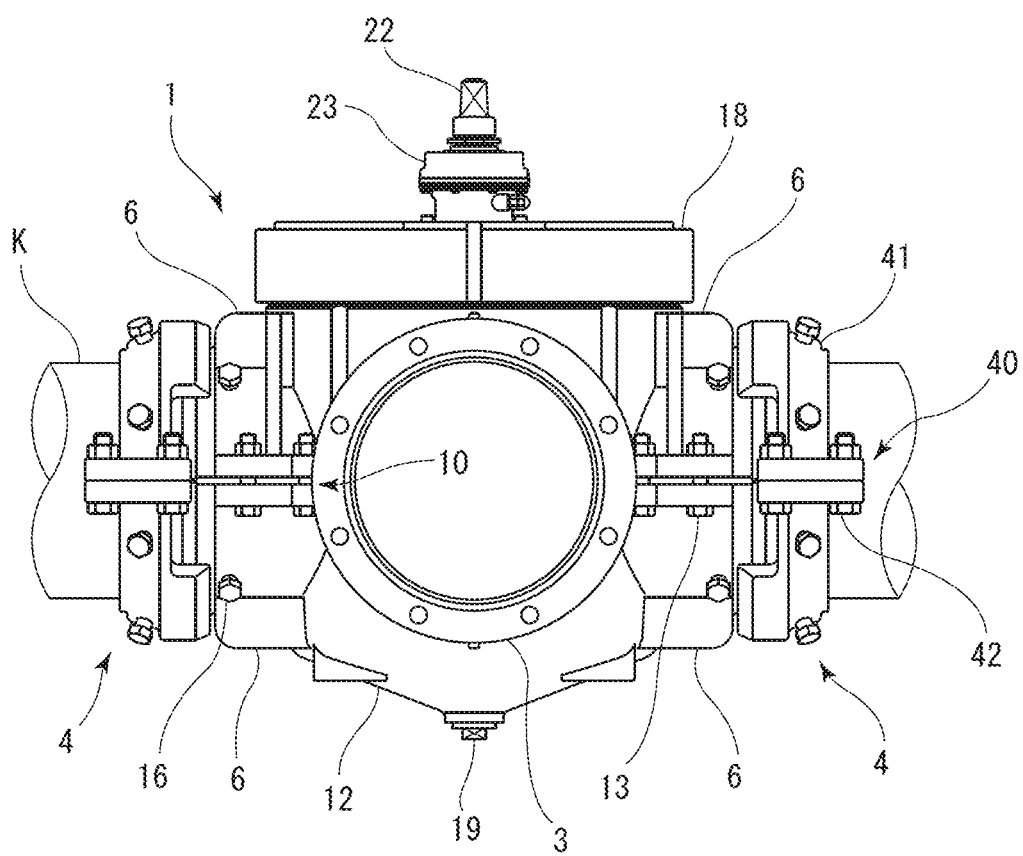
FIG. 7 Front view showing housing device in accordance with another embodiment of the present disclosure.
Figure 8:
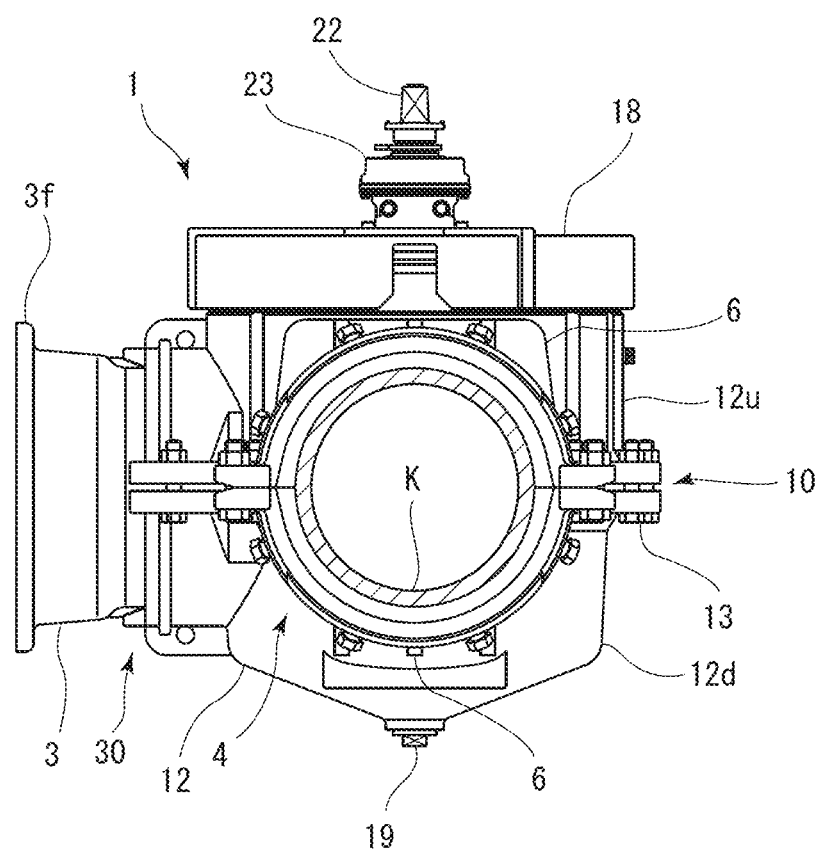
FIG. 8 Plan view showing housing device at FIG. 7.
Figure 9:
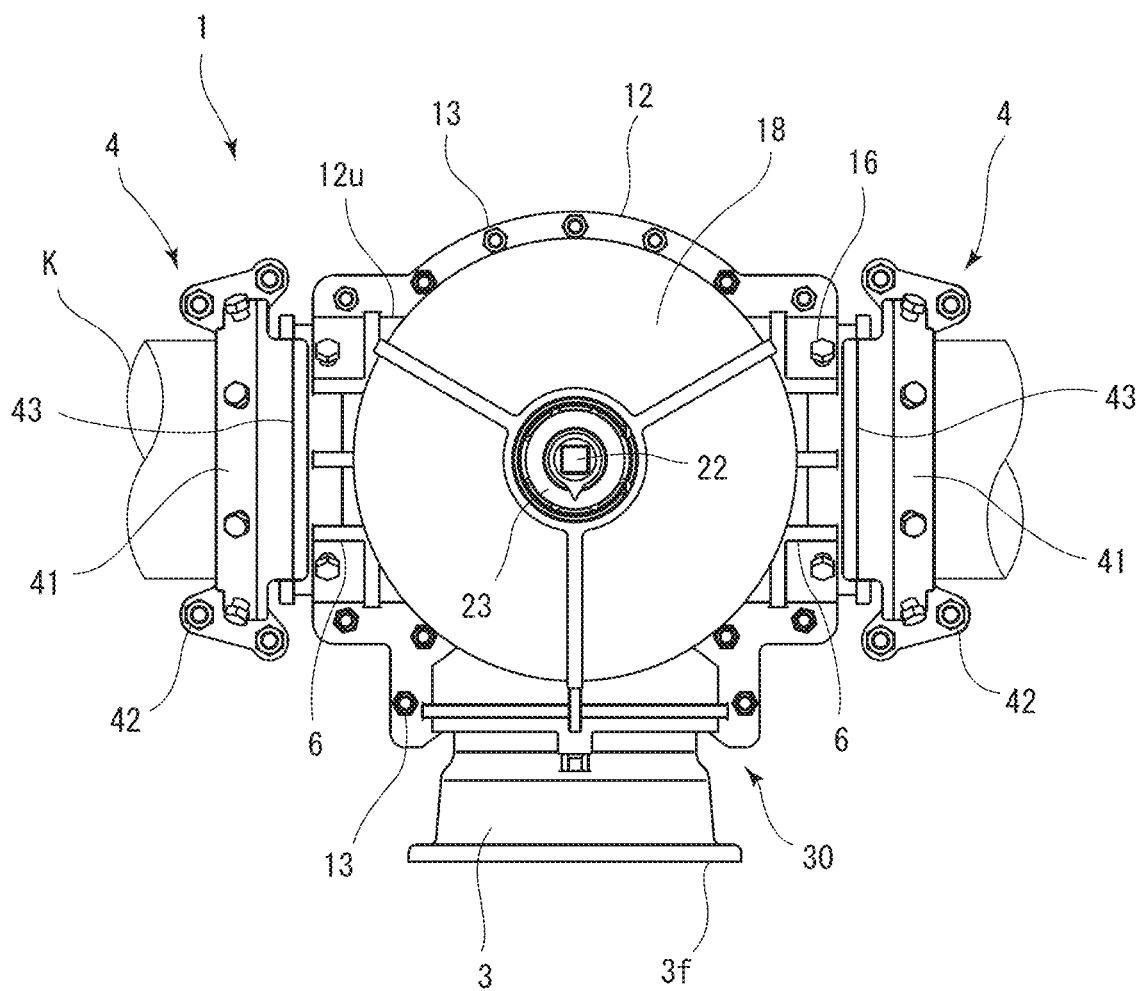
FIG. 9 Side view showing housing device at FIG. 7.
Figure 10:
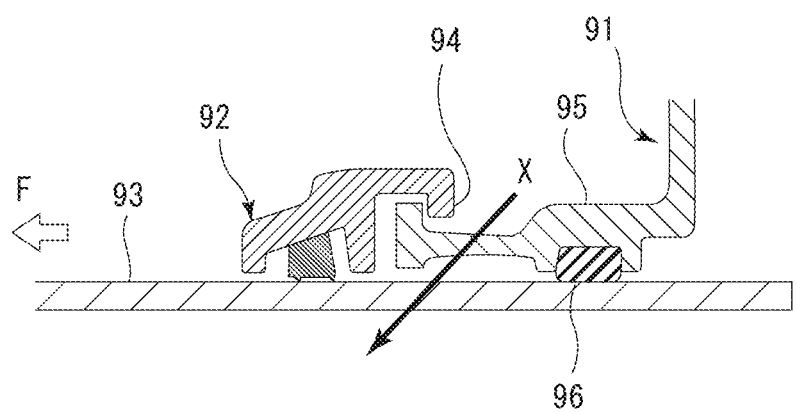
FIG. 10 Sectional view showing mounting location of restraint fixture in the context of conventional structure.

FIGS. 7 through 9 show another embodiment of a split T-shaped pipe 1 serving as housing device. Apart from the items described below, as it is in other respects similar to the embodiment described above, aspects in common therewith will be omitted, description being given primarily with respect to those aspects which differ with respect thereto. Where the constitution corresponds to the constitution described at the foregoing embodiment, like reference numerals are employed, and description that would be redundant is omitted. At this other embodiment, split T-shaped pipe 1 is provided with reinforcing ribs 6. Reinforcing ribs 6 are disposed at locations opposed to restraint fixtures 4, 4, being arranged so as to extend toward top and bottom from respective split segments 12*d*, 12*u*. Such constitution will make it possible to further improve the effect whereby reduction in diameter is suppressed when a separating force acts thereon.

Whereas the foregoing embodiment was described in terms of an example in which a switching valve serving as valve device was contained within the interior of a split T-shaped pipe, there is no limitation with respect thereto, it being possible, for example, for a switching valve serving as valve device to be contained within the interior of the housing device. Of course, the housing device associated with the present disclosure is not limited to situations in which a valve body is contained within the interior thereof. Furthermore, the housing device of the present disclosure need not have a branched pipe connector for connection to a branched pipe.

Whereas the foregoing embodiment was described in terms of an example in which the housing device was a split T-shaped pipe employed when carrying out plumbing operations on a live pipe through which water flows without interruption, there is no limitation with respect thereto, it being possible, for example, for this to be a water leak repair fixture employed during repair of leaks at couplings in water pipes. Such a water leak repair fixture will make it possible for a sealed space to be formed within the interior of a case that engages with and is mounted to the outside of a water pipe in such fashion that a circumferential gap is formed at the outside circumference thereof, and will make it possible to cause fluid (i.e., water) that has leaked from a coupling to be prevented from leaking to the exterior.

Whereas the foregoing embodiment was described in terms of an example in which the housing device was mounted on a ductile cast iron pipe or steel pipe serving as water pipe K, there is no limitation with respect thereto, it also being possible for this to be used with PVC pipe or with fluid pipe formed from other such material.

While the housing device associated with the present disclosure is capable of being employed with water pipe, there is no limitation with respect thereto, it being possible for it to be employed with a wide variety of fluid pipes employing any of various liquids, gases, or other such fluids other than water.

The present disclosure should not be understood to be limited in any way by the foregoing embodiments, it being possible to carry out various modifications without departing from the gist of the present disclosure.

The invention claimed is:

1. A housing device comprising:
   an annular case having a split portion at at least one location in a circumferential direction and being configured to enclose an outer circumferential surface of a fluid pipe in a sealed state by way of sealing material, said annular case further comprising a projection which protrudes toward the exterior in a pipe axial direction of the fluid pipe at both end of the annular case;
   restraint fixtures;
   a clamp comprising a plurality of clamping bolts inserted through clamping bolt holes, said clamp being configured to cause the split portion to be joined when the plurality of the clamping bolts are tightened; and
   adjustment bolt holes configured such that respective adjustment bolts inserted therethrough press against the outer circumferential surface of the fluid pipe at either end of the case;
   wherein the projection comprises a pair of protrusion segments formed in such fashion as to protrude in the circumferential direction, only at locations on joint surfaces provided at ends in the circumferential direction of the annular case that are at either end, in a pipe axial direction of the fluid pipe, of the annular case,
   wherein the pair of protrusion segments is not formed within a region toward an interior in the pipe axial direction from the bolt holes,
   wherein each restraint fixture is configured to overhang and encircle a respective projections at each end of the annular case.

2. The housing device according to claim 1 wherein the pair of protrusion segments are mutually opposed in the circumferential direction.

3. The housing device according to claim 1 wherein the a pair of protrusion segments are located at edges of ends, in the pipe axial direction of the fluid pipe, of the case.

4. The housing device according to claim 1, wherein each restraint fixture further comprises a containing groove formed at an inner circumferential surface thereof.

5. The housing device according to claim 4, wherein a detent member is contained within each containing groove.

6. The housing device according to claim 1 wherein the annular case comprises the split portion at at least two locations such that the annular case comprises a plurality of split segments, and
   the clamp is configured to cause the plurality of split segments that make up the annular case to be joined when the plurality of the clamping bolts are tightened.

7. A method for mounting the housing device according to claim 1 comprising:
   enclosing the outer circumferential surface of the fluid pipe in the sealed state by the annular case, and
   tightening the plurality of clamping bolts to cause the split portion to be joined, and
   forming a gap at the split portion that is smaller at either end of the annular case than at another location.

8. The method for mounting the housing device according to claim 7 wherein, when the split portion is clamped, the pair of protrusion segments are mutually opposed.

9. The method for mounting the housing device according to claim 7 wherein the pair of protrusion segments are located at edges of ends, in the pipe axial direction of the fluid pipe, of the case.

10. The method for mounting the housing device according to claim 7 wherein a restraint fixture that has a two-part split structure in which a pair of split portions are present is made to engage with and be mounted to an outside of an end of the case that has a two-part split structure in which a pair of the split portions are present, at which time the pair of split portions that are present at the case are arranged in parallel fashion with respect to the horizontal direction, and the pair of split portions that are present at the restraint fixture are arranged in parallel fashion with respect to the vertical direction.

* * * * *